(12) United States Patent
Komatsubara et al.

(10) Patent No.: US 7,643,104 B2
(45) Date of Patent: Jan. 5, 2010

(54) FOAMED RESIN SHEET AND LIQUID CRYSTAL DISPLAY

(75) Inventors: Shigemaru Komatsubara, Chiyoda-ku (JP); Toru Horiguchi, Chiyoda-ku (JP)

(73) Assignee: Teijin Chemicals, Ltd., Tokyo (JP)

( * ) Notice: Subject to any disclaimer, the term of this patent is extended or adjusted under 35 U.S.C. 154(b) by 164 days.

(21) Appl. No.: 11/988,736

(22) PCT Filed: Jul. 7, 2006

(86) PCT No.: PCT/JP2006/314006

§ 371 (c)(1),
(2), (4) Date: Jan. 14, 2008

(87) PCT Pub. No.: WO2007/007852

PCT Pub. Date: Jan. 18, 2007

(65) Prior Publication Data

US 2009/0103003 A1    Apr. 23, 2009

(30) Foreign Application Priority Data

| | | | |
|---|---|---|---|
| Jul. 14, 2005 | (JP) | | 2005-205249 |
| Aug. 16, 2005 | (JP) | | 2005-235856 |
| Aug. 16, 2008 | (JP) | | 2005-235855 |

(51) Int. Cl.
    *G02F 1/1335* (2006.01)

(52) U.S. Cl. .................. 349/61; 349/112; 349/113

(58) Field of Classification Search .......... 349/61.112, 349/113
See application file for complete search history.

(56) References Cited

U.S. PATENT DOCUMENTS

| | | | | |
|---|---|---|---|---|
| 5,844,731 | A  * | 12/1998 | Kabumoto et al. | 359/869 |
| 2006/0210785 | A1 * | 9/2006 | Takada et al. | 428/304.4 |
| 2007/0054110 | A1 * | 3/2007 | Kawato et al. | 428/318.4 |

FOREIGN PATENT DOCUMENTS

| | | |
|---|---|---|
| JP | 3-78701 | 4/1991 |
| JP | 5-257002 | 10/1993 |
| JP | 9-20860 | 1/1996 |
| JP | 8-188709 | 7/1996 |
| JP | 2925745 | 5/1999 |
| JP | 2002-116306 | 4/2002 |
| JP | 2005-055883 | 3/2005 |
| JP | 2005-115051 | 4/2005 |

* cited by examiner

*Primary Examiner*—Mike Qi
(74) *Attorney, Agent, or Firm*—Wenderoth, Lind & Ponack, L.L.P.

(57) ABSTRACT

This invention relates to a foamed resin sheet containing closed-cells which have a specific average diameter and a specific volume ratio. The foamed resin sheet of this invention is excellent in light reflectance or light transmittance to visible light and is also excellent in light diffusing capability, and in particular it is suitable as a light reflective plate or light diffusing plate to be incorporated and used in a direct backlight unit for a large-screen liquid crystal display or a 15- to 39-inch large-screen liquid crystal television set. The industrial effect that this invention produces is remarkable.

20 Claims, No Drawings

FOAMED RESIN SHEET AND LIQUID CRYSTAL DISPLAY

TECHNICAL FIELD

This invention relates to a foamed resin sheet, a direct backlight unit using said foamed resin sheet as an optical sheet and a direct backlight liquid crystal display having said backlight unit.

TECHNICAL BACKGROUND

For illuminating units (backlight) for use in various liquid crystal displays such as a liquid crystal television set and the like, there are known a sidelight method in which a light source is placed on the side of a liquid crystal display panel and light from the light source is used to illuminate the liquid crystal display panel through a light guiding plate formed of an acrylic resin or the like and a direct method in which a light source is placed on the backside of a liquid crystal display panel.

In recent years, screens of liquid crystal displays are increasing in size. As illuminating units for large-screen liquid crystal displays, there have been increasingly employed direct illuminating units that do not much increase in weight for an increase in size and that can easily attain high luminance.

A liquid crystal display using a direct illuminating unit has a liquid crystal display panel, a plurality of linear light sources for illuminating the liquid crystal display panel, a light refractive plate that is arranged opposite to the light sources through the liquid crystal display panel and that is for reflecting light from the light sources and a light diffusing plate that is arranged between the light sources and the liquid crystal display panel and that is for uniformly diffusing light from the light sources and light reflected from the light reflective plate to the gamut of the liquid crystal display panel, and it has a constitution of the light reflective plate/light sources/light diffusing plate/liquid crystal display panel in this order. In some cases, one or a plurality of optical control films are arranged between the light diffusing plate and the liquid crystal display panel.

As a light refractive plate, there are known a light reflective plate having a metallic mirror surface formed by depositing a metal vapor deposition film on the surface of a substrate such as a metal and the like, a light reflective film formed of a film containing a white pigment such as titanium oxide and the like. Of these, the light reflective plate having a metallic mirror surface has a high reflectance, while it has a problem that since its reflection is specular reflection, reflected light does not go out in the front direction of a display and light cannot be effectively used. In addition thereto, it also has a problem that a so-called "cyclic luminance nonuniformity" is intense, that is, images of a plurality of linear light sources are liable to be maintained as they are, and in its light-emitting surface, regions directly above/on the linear light sources are brighter and any other regions are darker. The light reflective plate formed of a film containing a white pigment is required to have a large content of the pigment for inhibiting the leak of light through its back surface. Since, however, the white pigment absorbs light having a specific wavelength, an increase in light loss is no longer negligible when the content thereof in the film is increased, and the problem is that the reflectance decreases or that reflected light has a yellow tint.

Various reflective plates have been proposed for overcoming the above defects of reflective plates. For example, Japanese Patent No. 2925745 proposes a light reflective plate formed of a thermoplastic polyester foamed sheet. This light reflective plate is formed by impregnating a thermoplastic polyester resin sheet with a high-pressure inert gas and then heating this resin under atmospheric pressure to form bubbles, so that gas bubbles are contained in the resin in place of the white pigment. However, the light reflective plate formed of the above polyester foamed sheet has a defect that no sufficient reflectance can be obtained. Further, JP2005-115051A discloses a reflective plate obtained by forming a light-resistant layer on at least one surface of a polycarbonate resin foamed material layer. In this publication, specifically, a foamed sheet obtained by foaming a block copolymer of polycarbonate and polysiloxane is described as the polycarbonate resin foamed material layer. While this foamed sheet has a high reflectance, it has a problem that gas bubbles are connected in a line to be in the state of being cracked since the foaming during the production thereof is not stabilized, and besides this, the sheet has a defect that it is poor in heat resistance and is also poor in abrasion resistance. There has not yet been known any light reflective plate that has a high reflectance, that can maintain the color tone of light from a light source as it is emitted and that can inhibit the cyclic brightness nonuniformity caused due to the use of a plurality of linear light sources.

On the other hand, as a light diffusing plate, for example, JP-A 03-078701 discloses a resin composition prepared by adding calcium carbonate and titanium oxide to a polycarbonate resin, JP-A 05-257002 discloses a resin composition prepared by adding calcium carbonate or a crosslinked polyacrylate resin to a polycarbonate resin, JP-A 08-188709 discloses a resin composition prepared by incorporating a beady crosslinked acrylic resin into a polycarbonate resin, and further, JP-A 09-20860 discloses a resin composition prepared by adding a beady crosslinked acrylic resin and a fluorescent brightener to a polycarbonate resin. These techniques are those in which light diffusing agents are incorporated into resins for realizing the capability of light diffusing. However, there is involved a problem that the light diffusing agents per se are altered, or the yellowing of the matrix resins is induced, due to a thermal history that they suffer during the preparation of the light diffusing plates. JP-A 2002-116306 discloses a light diffusing sheet formed of a synthetic resin containing fine cells dispersed therein, and it shows that such a light diffusing sheet is used as an optical sheet in a backlight unit for a liquid crystal display. However, when this light diffusing sheet is used as a light diffusing plate for the direct backlight, there are involved problems that the light diffusing capability is insufficient and that light sources are easily seen through it so that the above cyclic brightness nonuniformity cannot be sufficiently inhibited. There has not yet been known any light diffusing plate that has desired performances in both transmittance and light diffusing capability.

Further, light reflective plates and light diffusing plates for use in liquid crystal displays of which the screen sizes are increasing as described above are required to have uniform performances all over their large areas. However, there has not yet been known any light reflective plate or light diffusing plate that exhibits uniform and excellent performances with regard to the capability of diffuse reflection of visible light or with regard to transmittance and the capability of diffusion of visible light. Further, it is considered that a form prepared by winding a sheet having a width of approximately 1 to 2 m and a length of approximately 100 to 1,000 m in the form of a roll is advantageous as a form for the production and shipment of the light reflective plate from the viewpoint of a production cost and a transportation cost. However, there has not yet been known any light reflective plate that exhibits uniform and excellent performances all over such a large area with regard to the capability of diffuse reflection of visible light.

DISCLOSURE OF THE INVENTION

This invention has been made for providing a light reflective plate that exhibits excellent performances all over a large area with regard to the capability of diffuse reflection of visible light, a light diffusing plate that exhibits uniform and excellent performances all over a large area with regard to the transmittance of visible light and the capability of diffusion of visible light, a roll of the above light reflective plate, a direct backlight unit having at least one of the above light reflective plate and a light diffusing plate, and a direct backlight liquid crystal display having the above direct backlight unit.

For achieving the above objects, the present inventors have made diligent studies. As a result it has been found that a foamed resin sheet containing closed-cells having a specific average diameter and a specific volume ratio is excellent in light reflectance and light transmittance to visible light and is also excellent in light diffusion capability, and this invention has been accordingly completed.

That is, according to this invention, the above objects can be achieved, first, by a foamed resin sheet that has closed-cells having an average diameter of 0.1 to 5 μm, that has a thickness of 0.1 to 10 mm, that has a cell content of 5 to 90 vol %, that satisfies the following expression in which X (μm) is an average diameter of the closed-cells, Y (vol %) is the cell content and T (mm) is a thickness of the sheet, that has a diffuse reflectance of 80% or more and a reflection haze value of 95% or more and that is for use as a light reflective plate.

$$\log_{10}(Y) \geq A \times \log_{10}(x) + B$$

$$A = 0.037 \times T + 0.96$$

$$B = -0.203 \times T + 1.21$$

The above objects of this invention can be achieved, secondly, by a foamed resin sheet that has closed-cells having an average diameter of 30 to 100 μm, that has a cell content of 10 to 90 vol %, that satisfies the following expression in which X (μm) is an average diameter of the closed-cells and Y (vol %) is a cell content, that has a total light transmittance of 50% or more and a transmission haze value of 95% or more and that is for use as a light diffusing plate.

$$1.4 \times \log_{10}(X) - 1.5 \leq \log_{10}(Y) \leq 2.5 \times \log_{10}(X) - 2.2$$

The above objects of this invention can be achieved, thirdly, by a direct backlight unit comprising a light reflective plate, a light source and a light diffusing plate, said light reflective plate or said light diffusing plate being one of the above foamed resin sheet.

The objects of this invention can be achieved, finally, by a direct backlight liquid crystal display having the above direct backlight unit.

BEST MODE FOR CARRYING OUT THE INVENTION

The foamed resin sheet of this invention contains closed-cells dispersed in a resin matrix. The above closed-cells have an average diameter of 0.1 to 5 μm or 30 to 100 μm. The foamed resin sheet containing the above closed-cells, provided by this invention, can exhibit a high light scattering effect, and can be hence most suitably used as an optical sheet for a direct backlight liquid crystal display. The above optical sheet includes a light reflective plate or a light diffusing plate.

The foamed resin sheet of this invention will be explained below with regard to preferred embodiments thereof as a light reflective plate and preferred embodiments thereof as a light diffusing plate one by one.

In the following explanation, an embodiment of the foamed resin sheet suitable for use as a light reflective plate will be sometimes referred to as "light reflective plate of this invention", and an embodiment of the foamed resin sheet suitable for use as a light diffusing plate, as "light diffusing plate of this invention".

[Light Reflective Plate]

The thickness of the light reflective plate of this invention is 0.1 to 10 mm, preferably 0.5 to 5 mm.

The number average diameter of the closed-cells contained in the light reflective plate of this invention is in the range of 0.1 to 5 μm, and it is preferably in the range of 0.2 to 3 μm, more preferably in the range of 0.3 to 2 μm. When the number average diameter of the closed-cells exceeds 5 μm, the foamed resin sheet sometimes exhibits insufficient diffuse reflectance and is sometimes not preferred as a light reflective plate. The number average diameter of the closed-cells refers to an average of values obtained by determining areas of cross sections of the cells and converting such areas to diameters of circles having such areas, and it can be known from an image prepared by taking a photograph of cross section of a foamed resin sheet with a scanning electron microscope.

In the light reflective plate of this invention, the cell content, i.e., the ratio of volume of the closed-cells to the total volume of the resin sheet is 5 to 90 vol %. When this value is less than 5 vol %, undesirably, the diffuse reflectance of a resin sheet obtained is sometimes insufficient. When it exceeds 90 vol %, undesirably, the mechanical properties of a resin sheet obtained is sometimes impaired.

When the value of the above cell content is in the range of 5 to 45 vol %, preferably 8 to 44 vol %, more preferably 10 to 43 vol %, the relationship of the number average diameter X (μm) of the closed-cells, the cell content Y (vol %) and the thickness T (mm) of the sheet preferably satisfies the following expression (1) or (2).

$$\log_{10}(Y) \geq A \times \log_{10}(X) + B \quad (1)$$

(in which $10^{\{(D-B)/(A-C)\}} < X \leq 5$)

$$\log_{10}(Y) \geq C \times \log_{10}(X) + D \quad (2)$$

(in which $0.1 \leq X \leq 10^{\{(D-B)/(A-C)\}}$)

$$A = 0.037 \times T + 0.96$$

$$B = -0.203 \times T + 1.21$$

$$C = 0.045 \times T + 0.28$$

$$D = -0.133 \times T + 1.02$$

In the above case, more preferably, the relationship of the number average diameter X (μm) of the closed-cells, the cell content Y (vol %) and the thickness T (mm) of the sheet satisfies the following expression (3) or (4).

$$\log_{10}(Y) \geq E \times \log_{10}(X) + F \quad (3)$$

(in which $10^{\{(H-F)/(E-G)\}} < X \leq 5$)

$$\log_{10}(Y) \geq G \times \log_{10}(X) + H \quad (4)$$

(in which $0.1 \leq X \leq 10^{\{(H-F)/(E-G)\}}$)

$$E = 0.0065 \times T + 0.97$$

$$F = -0.117 \times T + 1.38$$

$$G = 0.027 \times T + 0.30$$

$$H = -0.104 \times T + 1.24$$

On the other hand, when the value of the cell content is in the range of over 45 vol % but less than 46 vol % or in the range of 46 to 90 vol %, preferably in the range of 46.5 to 85 vol %, more preferably in the range of 47 to 80 vol %, the relationship of the number average diameter X (µm) of the closed-cells, the cell content Y (vol %) and the thickness T (mm) of the sheet preferably satisfies the following expression (5).

$$\log_{10}(Y) \geq I \times \log_{10}(X) + J \quad (5)$$

$$I = 0.037 \times T + 0.96$$

$$J = -0.203 \times T + 1.21$$

In the above case, more preferably, the relationship of the number average diameter X (am) of the closed-cells, the cell content Y (vol %) and the thickness T (mm) of the sheet preferably satisfies the following expression (6).

$$\log_{10}(Y) \geq K \times \log_{10}(X) + L \quad (6)$$

$$K = 0.0065 \times T + 0.97$$

$$L = -0.117 \times T + 1.38$$

The above foamed resin sheet of this invention exhibits high diffuse reflectance and high reflection haze values and can be suitably used as a light reflective plate for a direct backlight liquid crystal display. The diffuse reflectance as used herein refers to a value obtained by determining a total intensity of all of diffuse reflection components of reflected light of light that enters a sample at an incidence angle 0° (in the direction perpendicular to the measurement surface of the sample) as a relative value (%) to reflected light from a barium sulfate white plate and integrating such values in the range of measurement wavelength region of 400 to 800 nm and averaging them. Further, the above reflection haze value refers to a ratio of an integrated value of quantity of light reflected at angles different from the incidence angle to a total reflection quantity when a reflective plate reflects light that enters at an incidence angle of 45°.

The diffuse reflectance of the light reflective plate of this invention is 80% or more, preferably 83% or more. The upper limit of the diffuse reflectance is not specially limited, while the value of the diffuse reflectance is preferably 100% or less. Even if a light reflective plate has a diffuse reflectance of 95% or less, it can be suitably used as a light reflective plate. The reflection haze value is 95% or more, preferably 98% or more, more preferably 99% or more. The above high diffuse reflectance and high reflection haze can be realized when the relationship of the number average diameter X (µm) of the closed-cells contained in the foamed resin sheet, the cell content Y (vol %) and the thickness T (mm) of the sheet is adjusted as described above.

The above diffuse reflectance and reflection haze values of the light reflective plate of this invention are uniform all over a remarkably broad area thereof. In the light reflective plate of this invention, the value obtained by dividing a difference between an average value of diffuse reflectance values at two points 450 mm far away in the width direction thereof from a center point in the width direction thereof and a diffuse reflectance value at the above center point by the diffuse reflectance value at the above center point can be within ±0.05. Further, it can be within ±0.03, and in particular it can be within ±0.02.

In the light reflective plate of this invention, further, the value obtained by dividing an average value of reflection hazes at two points 450 mm far away in the width direction from a center point in the width direction thereof by a reflection haze at the above center point can be 0.95 to 1.05, further, it can be 0.97 to 1.03, and in particular it can be 0.99 to 1.01. The "width direction" as used above refers to a direction in parallel with the minor side of a light reflective plate.

Therefore, the light reflective plate of this invention is not only suitably used in a large-screen liquid crystal display, but also it can be produced as a large-length sheet having a width, preferably, of 1 to 2 m and a length, preferably, of 100 to 1,000 m, and can be stored, transported and delivered in the form of a roll, so that it serves to decrease a production cost, a storage cost, a transportation cost and the like.

The light reflective plate of this invention contains closed-cells dispersed in a resin matrix. In the light reflective plate of this invention, if the difference between the refractive index of the matrix resin and that of the closed-cells is increased, a greater light scattering effect can be obtained. From this viewpoint, for example, carbon dioxide (n÷1), nitrogen (n÷1), air (refractive index n=1) and the like, are preferred as a gas to be contained in the closed-cells, and besides these, argon, hydrogen, oxygen, propane, butane and the like, can be used.

As a material for constituting the matrix resin of the light reflective plate of this invention, a polycarbonate resin is preferred. This polycarbonate resin is preferably a resin obtained by reacting, for example, a dihydric phenol and a carbonate precursor according to an interfacial polymerization method or a melt polymerization method.

Typical examples of the above dihydric phenol include 2,2-bis(4-hydroxyphenyl)propane (generally called "bisphenol A"), 2,2-bis{(4-hydroxy-3-methyl)phenyl}propane, 2,2-bis(4-hydroxyphenyl)butane, 2,2-bis(4-hydroxyphenyl)-3-methylbutane, 2,2-bis(4-hydroxyphenyl)-3,3-dimethylbutane, 2,2-bis(4-hydroxyphenyl)-4-methylpentane, 1,1-bis(4-hydroxyphenyl)cyclohexane, 1,1-bis(4-hydroxyphenyl)-3,3,5-trimethylcyclohexane, 9,9-bis{(4-hydroxy-3-methyl)phenyl}fluorene, α,α'-bis(4-hydroxyphenyl)-m-diisopropylbenzene and the like. Of these, bisphenol A is preferred. These dihydric phenols can be used singly or as a mixture of the two or more of them.

Examples of the above carbonate precursor include carbonyl halides, carbonate esters or haloformates. Specific examples of these include phosgene, diphenyl carbonate and dihaloformate of dihydric phenol.

When a polycarbonate resin is produced by reacting the above dihydric phenol and carbonate precursor according to an interfacial polymerization method or a melt polymerization method, a catalyst, a terminal stopper, an antioxidant for the dihydric phenol and the like, may be used as required.

The polycarbonate resin may be a branched polycarbonate resin, a polyester carbonate resin, or the like. The above branched polycarbonate resin can be obtained by copolymerizing a polyfunctional aromatic compound having 3 or more phenolic hydroxyl groups in addition to the above dihydric phenol and polycarbonate resin. The above polyester carbonate resin can be obtained by copolymerizing an aromatic or aliphatic dicarboxylic acid compound in addition to the dihydric phenol and carbonate precursor.

The polycarbonate resin for use as a material for the light reflective plate of this invention is preferably a resin having no polysiloxane block.

The polycarbonate resin for use as a material for the light reflective plate of this invention may be a mixture of two or more polycarbonate resins obtained as described above.

The molecular weight of the polycarbonate resin is, as a viscosity average molecular weight, preferably 10,000 to 40,000, more preferably 15,000 to 35,000. The viscosity average molecular weight (M) as used in this invention is obtained by measuring a solution of 0.7 g of a polycarbonate resin in 100 mL of methylene chloride at 20° C. for a specific viscosity ($\eta_{sp}$) and substituting the specific viscosity in the following expression.

$$\eta_{sp}/c=[\eta]+0.45\times[\eta]^2 c$$

$$[\eta]=1.23\times10^{-4}M^{0.83}$$

(wherein c=0.7 and "$\eta$" is an intrinsic viscosity.)

The polycarbonate resin for use as a material for the light reflective plate of this invention may contain other components, such as a fluorescent brightener, a thermal stabilizer, a mold release agent, an ultraviolet absorbent, a bluing agent, a flame retardant, flame retardant auxiliary and the like, as required so long as the objects and effects of this invention are not impaired.

The above fluorescent brightener can be incorporated for improving the color tone of the polycarbonate resin so that the color tone is white or bluish white, and there is therefore produced an effect on more improvement of the luminance of a liquid crystal display using the light reflective plate of this invention. The above fluorescent brightener works to absorb the energy of ultraviolet region of light from a light source and to radiate this energy as visible light.

Examples of the above fluorescent brightener include a stilbenzene compound, a benzimidazole compound, a benzoxazole compound, a naphthalimide compound, a Rhodamine compound, a coumarin compound and an oxazine compound. Of these, a benzoxazole compound or a coumarin compound is preferred. These fluorescent brighteners may be used singly or as a mixture of the two or more of them. Examples of commercial products of these include KAYALIGHT OS (CI Fluorescent Brightener 219:1, benzoxazole compound) supplied by NIPPON KAYAKU CO., LTD., "Hakkol PSR (coumarin compound) supplied by Hakkol Chemical CO., Ltd.), and EASTOBRITE OB-1 supplied by Eastman Chemical Company.

The amount ratio of the fluorescent brightener per 100 parts by weight of the polycarbonate resin to be used is preferably 3 parts by weight or less, more preferably 0.0001 to 3 parts by weight, still more preferably 0.0002 to 0.5 part by weight, particularly preferably 0.0003 to 0.1 part by weight, and above all, it is 0.0005 to 0.05 part by weight that is the most preferred. When incorporated and used in a backlight unit, the light reflective plate obtained from the polycarbonate resin containing the fluorescent brightener in the above amount range exhibits sufficient surface emission capability, and a light-emitting surface is more improved in color tone and comes to be free of nonuniformity in color tone (hue), which is desirable.

The above thermal stabilizer can be incorporated for preventing a decrease in molecular weight and the aggravation of the hue during the molding of the polycarbonate resin. This thermal stabilizer includes phosphorous acid, phosphoric acid, phosphonous acid, phosphonic acid and ester compounds of these.

Specific examples of the thermal stabilizer include phosphite compounds such as triphenyl phosphite, tris (nonylphenyl) phosphite, tridecyl phosphite, trioctyl phosphite, trioctadecyl phosphite, didecyl monophenyl phosphite, dioctyl monophenyl phosphite, diisopropyl monophenyl phosphite, monobutyl diphenyl phosphite, monodecyl diphenyl phosphite, monooctyl diphenyl phosphite, tris(2,4-di-tert-butyl phenyl)phosphite, bis(2,6-di-tert-butyl-4-methylphenyl)pentaerythritol diphosphite, 2,2-methylenebis(4,6-di-tert-butyl phenyl)octyl phosphite, bis(nonylphenyl)pentaerythritol diphosphite, bis(2,4-di-tert-butyl phenyl)pentaerythritol diphosphite and the like; phosphate compounds such as distearyl pentaerythritol diphosphite, tributyl phosphate, triethyl phosphate, trimethyl phosphate, triphenyl phosphate, diphenyl monooxoxenyl phosphate, dibutyl phosphate, dioctyl phosphate, diisopropyl phosphate and the like; phosphonite compounds such as tetrakis(2,4-di-iso-propylphenyl)-4,4'-biphenylene diphosphonite, tetrakis(2,4-di-n-butylphenyl)-4,4'-biphenylene diphosphonite, tetrakis(2,4-di-tert-butylphenyl)-4,4'-biphenylene diphosphonite, tetrakis(2,4-di-tert-butylphenyl)-4,3'-biphenylene diphosphonite, tetrakis(2,4-di-tert-butylphenyl)-3,3'-biphenylene diphosphonite, tetrakis(2,6-di-iso-propylphenyl)-4,4'-biphenylene diphosphonite, tetrakis(2,6-di-n-butylphenyl)-4,4'-biphenylene diphosphonite, tetrakis(2,6-di-tert-butylphenyl)-4,4'-biphenylene diphosphonite, tetrakis(2,6-di-tert-butylphenyl)-4,3'-biphenylene diphosphonite, tetrakis(2,6-di-tert-butylphenyl)-3,3'-biphenylene diphosphonite, bis(2,4-di-tert-butylphenyl)-biphenyl phosphonite and the like; and phosphonate compounds such as dimethyl benzenephosphonate, diethyl benzenephosphonate, dipropyl benzenephosphonate and the like. Of these, tris(2,4-di-tert-butylphenyl) phosphite, distearyl pentaerythritol diphosphite, trimethyl phosphate, tetrakis(2,4-di-tert-butylphenyl)-4,4'-biphenylene diphosphonite or bis(2,4-di-tertbutylphenyl)biphenylphosphonite is preferred.

These thermal stabilizers may be used singly or as a mixture of the two or more of them. The amount of the above thermal stabilizer per 100 parts by weight of the polycarbonate resin is preferably 0.5 part by weight or less, more preferably 0.001 to 0.5 part by weight.

The above mold release agent can be incorporated for improving releasability from a metal roll when the polycarbonate resin is extrusion-molded. As a mold release agent, it is preferred to use a fatty acid ester compound. This fatty acid ester is preferably a partial ester or full ester obtained from a monohydric or polyhydric alcohol having 1 to 20 carbon atoms and a saturated fatty acid having 10 to 30 carbon atoms. Specific examples thereof include stearic monoglyceride, stearic diglyceride, stearic triglyceride, stearic monosorbitate, behenic monoglyceride, pentaerythritol monostearate, pentaerythritol tetrastearate, pentaerythritol tetrapelargonate, propylene glycol monostearate, stearyl stearate, palmityl palmitate, butyl stearate, methyl laurate, isopropyl palmitate, biphenyl biphenate, sorbitan monostearate, 2-ethylhexyl stearate and the like, and of these, stearic monoglyceride, stearic triglyceride or pentaerythritol tetrastearate is preferred for use. The amount of the mold release agent per 100 parts by weight of the polycarbonate resin is preferably 0.5 part by weight or less, more preferably 0.001 to 0.5 part by weight.

Since the light reflective plate of this invention is discontinuously or continuously exposed to strong light having various wavelength distributions of the ultraviolet region to the visible light region from a light source for a long period of time, an ultraviolet absorbent is preferably incorporated into the polycarbonate resin to be used as a material therefor, for suppressing the deterioration or discoloration that the light causes on the light reflective plate.

Examples of the above ultraviolet absorbent include a benzophenone compound, a benzotriazole compound, a benzoxazine compound, a hydroxyphenyl triazine compound, a polymer type ultraviolet absorbent and the like. With regard to specific examples thereof, examples of the benzophenone compound include 2,4-dihydroxybenzophenone, 2-hydroxy- 4-methoxybenzophenone, 2-hydroxy-4-octoxybenzophenone, 2-hydroxy-4-benzyloxybenzophenone, 2-hydroxy-4-methoxy-5-sulfoxybenzophenone, 2-hydroxy-4-methoxy-5-sulfoxytrihydrideratebenzophenone, 2,2'-dihydroxy-4-methoxybenzophenone, 2,2',4,4'-tetrahydroxybenzophenone, 2,2'-dihydroxy-4,4'-dimethoxybenzophenone, 2,2'-dihydroxy-4,4'-dimethoxy-5-sodiumsulfoxybenzophenone, bis(5-benzoyl-4-hydroxy-2-methoxyphenyl)methane, 2-hydroxy-4-n-dodecyloxybenzophenone, 2-hydroxy-4-methoxy-2'-carboxybenzophenone and the like.

Examples of the above benzotriazole compound include 2-(2-hydroxy-5-methylphenyl)benzotriazole, 2-(2-hydroxy-5-tert-octylphenyl)benzotriazole, 2-(2-hydroxy-3,5-dicumylphenyl)phenylbenzotriazole, 2-(2-hydroxy-3-tert-butyl-5-methylphenyl)-5-chlorobenzotriazole, 2,2'-methylenebis[4-(1,1,3,3-tetramethylbutyl)-6-(2H-benzotriazole-2-yl)phenol], 2-(2-hydroxy-3,5-di-tert-butylphenyl)benzotriazole, 2-(2-hydroxy-3,5-di-tert-butylphenyl)-5-chlorobenzotriazole, 2-(2-hydroxy-3,5-di-tert-amylphenyl)benzotriazole, 2-(2-hydroxy-5-tert-octylphenyl)benzotriazole, 2-(2-hydroxy-5-tert-butylphenyl)benzotriazole, 2-(2-hydroxy-4-octoxyphenyl)benzotriazole, 2,2'-methylenebis(4-cumyl-6-benzotriazolephenyl), 2,2'-p-phenylenebis(1,3-benzoxazin-4-one), 2-[2-hydroxy-3-(3,4,5,6-tetrahydrophthalimidomethyl)-5-methylphenyl]benzotriazole and the like. Of these, 2-(2-hydroxy-5-tert-octylphenyl)benzotriazole, 2-(2-hydroxy-3,5-dicumylphenyl)phenylbenzotriazole, 2-(2-hydroxy-3-tert-butyl-5-methylphenyl)-5-chlorobenzotriazole or 2,2'-methylenebis[4-(1,1,3,3-tetramethylbutyl)-6-(2H-benzotriazol-2-yl)phenol] is preferred.

Examples of the above benzoxazine compound include 2,2'-p-phenylenebis(3,1-benzoxazin-4-one), 2,2'-m-phenylenebis(3,1-benzoxazin-4-one) and 2,2'-p,p'-diphenylenebis(3,1-benzoxazin-4-one) and, the like.

Examples of the above hydroxyphenyltriazine compound include 2-(4,6-diphenyl-1,3,5-triazin-2-yl)-5-hexyloxyphenol, 2-(4,6-diphenyl-1,3,5-triazin-2-yl)-5-methyloxyphenol, 2-(4,6-diphenyl-1,3,5-triazin-2-yl)-5-ethyloxyphenol, 2-(4,6-diphenyl-1,3,5-triazin-2-yl)-5-propyloxyphenol, 2-(4,6-diphenyl-1,3,5-triazin-2-yl)-5-butyloxyphenol and other compounds formed by replacing the phenyl group in the above-described compounds with 2,4-dimethylphenyl group, such as 2-(4,6-bis(2,4-dimethylphenyl)-1,3,5-triazin-2-yl)-5-hexyloxyphenol and the like.

The above polymer type ultraviolet absorbent includes copolymers obtained from at least one selected from an ultraviolet-absorbing monomer and a photo-stabilizing monomer, and another monomer. As an ultraviolet-absorbing monomer, for example, a compound having a benzotriazole structure, a benzophenone structure, a triazine structure or a benzoxazine structure in an ester substituent of (meth)acrylic ester can be described as a preferred one. Examples of the above photo-stabilizing monomer include 2,2,6,6-tetramethyl-4-piperidyl methacrylate, 1,2,2,6,6-pentamethyl-4-piperidyl methacrylate, 1-ethyl-2,2,6,6-tetramethyl-4-piperidyl methacrylate, 1-propyl-2,2,6,6-tetramethyl-4-piperidyl methacrylate, 1-t-butyl-2,2,6,6-tetramethyl-4-piperidyl methacrylate, 1-cyclohexyl-2,2,6,6-tetramethyl-4-piperidyl methacrylate, 1-(4-methylcyclohexyl)-2,2,6,6-tetramethyl-4-piperidyl methacrylate, 1-t-octyl-2,2,6,6-tetramethyl-4-piperidyl methacrylate, 1-decyl-2,2,6,6-tetramethyl-4-piperidyl methacrylate, 1-dodecyl-2,2,6,6-tetramethyl-4-piperidyl methacrylate, 1-methoxy-2,2,6,6-tetramethyl-4-piperidyl methacrylate, 1-ethoxy-2,2,6,6-tetramethyl-4-piperidyl methacrylate, 1-propoxy-2,2,6,6-tetramethyl-4-piperidyl methacrylate, 1-t-butoxy-2,2,6,6-tetramethyl-4-piperidyl methacrylate, 1-cyclohexyloxy-2,2,6,6-tetramethyl-4-piperidyl methacrylate, 1-(4-methylcyclohexyloxy)-2,2,6,6-tetramethyl-4-piperidyl methacrylate, 1-octoxy-2,2,6,6-tetramethyl-4-piperidyl methacrylate, 1-t-octoxy-2,2,6,6-tetramethyl-4-piperidyl methacrylate, 1-decyloxy-2,2,6,6-tetramethyl-4-piperidyl methacrylate, 1-dodecyloxy-2,2,6,6-tetramethyl-4-piperidyl methacrylate and the like. The above "other" monomer includes, for example, alkyl (meth)acrylate having an alkyl group having 1 to 4 carbon atoms. These monomers can be copolymerized, for example, by radical polymerization.

Of these ultraviolet absorbents, at least one ultraviolet absorbent selected from the group consisting of the benzophenone compound, the benzotriazole compound and the benzoxazine compound is preferably used.

These ultraviolet absorbents may be used singly or the two or more of them may be used in combination.

The amount of the ultraviolet absorbent to be incorporated differs in optimum amount depending upon whether or not the light reflective plate of this invention has a protective film which will be described later.

When the light reflective plate of this invention has a protective film containing an ultraviolet absorbent, the amount of the ultraviolet absorbent to be incorporated into the polycarbonate resin, per 100 parts by weight of the polycarbonate, is preferably 0 to 0.5 part by weight, more preferably 0 to 0.3 part by weight. When the light reflective plate has no protective film containing an ultraviolet absorbent, the amount of the above ultraviolet absorbent per 100 parts by weight of the polycarbonate resin is 2 parts by weight or less, more preferably 0.01 to 2 parts by weight, still more preferably 0.01 to 1 part by weight, particularly preferably 0.01 to 0.8 part by weight, and it is the most preferably 0.02 to 0.5 part by weight. When the content of the ultraviolet absorbent exceeds 2 parts by weight, the light reflective plate may be altered.

The light reflective plate of this invention may have a protective film on at least one surface thereof. Preferably, the light reflective plate of this invention has the protective film on its surface that is to be on the light source side when it is incorporated into a backlight unit and used.

As a material for constituting the protective film, an organic polymer is preferred. This organic polymer is preferably an acrylic resin, a polycarbonate resin, a polyethylene resin or a polyester resin or polyester elastomer. Above all, an acrylic resin or a polycarbonate resin is more preferred.

The above acrylic resin is a resin that is obtained by polymerization of an acrylic monomer. Examples of the acrylic monomer include methyl acrylate, ethyl acrylate, propyl acrylate, butyl acrylate, 2-ethylhexyl acrylate, methyl methacrylate, ethyl methacrylate, propyl methacrylate, butyl methacrylate, 2-ethylhexyl methacrylate, phenyl methacrylate and the like. The acrylic resin can be obtained by homopolymerizing one of the above acrylic monomers or copolymerizing two or more acrylic monomers of them.

The above polycarbonate resin is similar to the polycarbonate that is already described as a material for constituting the matrix resin of the reflective plate of this invention.

The above polyester resin includes a polyethylene terephthalate resin, a polybutylene terephthalate resin and a polyethylene naphthalate resin.

The protective film may contain an ultraviolet absorbent. When an ultraviolet absorbent is contained in the protective film, it efficiently inhibits that deterioration of the polycarbonate resin of the light reflective plate which is caused by light from a backlight light source, and it produces an effect on the prevention of a decrease in luminance and a change in color tone. The deterioration of the polycarbonate resin of the light reflective plate by light from a backlight light source starts to proceed on a surface on the light source side. When the protective film containing an ultraviolet absorbent is formed on the light source side surface of the light reflective plate, therefore, it is effective for inhibiting the photo-deterioration of the light reflective plate. As the above ultraviolet absorbent, it is preferred to incorporate at least one ultraviolet absorbent selected from the group consisting of a benzophenone compound, a benzotriazole compound and a benzoxazine compound. Specific examples of these ultraviolet absorbents are similar to the specific examples that are already described as ultraviolet absorbents that can be incorporated into the polycarbonate resin to be used as a material for the reflective plate of this invention. The concentration of the ultraviolet absorbent in the protective film, based on the total of the organic polymer and the ultraviolet absorbent, is preferably 0.1 to 50% by weight, more preferably 0.5 to 40% by weight, still more preferably 1 to 30% by weight.

The thickness of the protective film is preferably in the range of 0.1 to 500 μm, more preferably in the range of 1 to 100 μm, still more preferably in the range of 2 to 70 μm. Although differing depending upon its forming method, the optimum range of the thickness of the protective film will be described later.

[Method for Producing Light Reflective Plate]

The method for producing the light reflective plate of this invention includes (1) a method in which a resin is molded in the form of a sheet, the material resin is impregnated with an inert gas and they are foamed (batch method), (2) a method in which a resin as a raw material is melted in a proper molding machine, a gas inert to the resin is injected into the molten resin and the resin is extrusion-molded in the form of a sheet together while they are foamed (continuous method) and (3) a method in which a raw material composition containing a raw material resin and a foaming agent is prepared and it is foamed while it is molded in the form of a sheet.

In the above method (1), when the raw material resin is molded in the form of a sheet, for example, there can be employed a method in which the resin melted in a melt-extruder or the like is extruded in the form of a sheet through a T-die and a sheet is held and pressed between a plurality of cooling rolls and taken up with a take-up roll. The resultant roll can be used in a subsequent step as it is, or sheets obtained by cutting it in a sheet form may be used. For impregnating the resultant sheet in the form of a roll or the sheets with the inert gas, for example, a method described in PCT Japanese Translation Version Publication No. 06-506724 can be employed. Specifically, it is a method in which the above sheet(s) is impregnated with a gas under high-pressure or supercritical conditions in a pressure vessel and the impregnated sheet(s) that is then taken out of the pressure vessel is heated to a glass transition temperature (Tg) or higher to grow gas bubbles.

The gas inert to the above raw material resin includes, for example, carbon dioxide, nitrogen, air, argon, hydrogen, oxygen, propane, butane and the like, and a mixture of the two or more of these may be used. Of these, carbon dioxide or nitrogen is preferred from the viewpoint of inertness to the resin, solubility in the resin and easiness in handling. When a mixture containing carbon dioxide is used as a gas inert to the resin, the concentration of the carbon dioxide is preferably 50% by volume or more, more preferably 80% by volume or more.

The pressure for impregnating the resin sheet with the above gas is preferably 1 to 50 MPa, more preferably 5 to 50 MPa. The temperature at which the resin sheet is impregnated with the above gas is preferably 20 to 140° C., more preferably 20 to 120° C. The amount of the gas which the resin is impregnated with is preferably 0.1 to 0.5% by weight, more preferably 0.2 to 0.4% by weight, based on the weight of the resin. The temperature for heating the impregnated sheet taken out of the pressure vessel is preferably a temperature higher than Tg of the resin by 5 to 15° C. When the material resin is a polycarbonate resin, this temperature is preferably 155 to 165° C. As a method for heating the impregnated sheet taken out of the pressure vessel, for example, heating in an oil bath can be employed.

As a molding machine that can be used in the above method (2), there can be employed a melt extruder and the like. As a melt extruder, a single-screw extruder, a twin-screw extruder and the like, can be used as required. The melt extruder is preferably an extruder having a dedicated screw for homogeneously kneading/diffusing the resin and the gas inert to the resin, a pressure cylinder, a dedicated die and a fluid-dispersing nozzle. The above fluid-dispersing nozzle refers to a nozzle that is arranged in the downstream of the plasticization portion of the melt extruder and that is for stably injecting the inert gas into the raw material resin under high-pressure or supercritical conditions. The raw material resin is melted in the plasticization portion in the melt extruder and mixed and kneaded with the gas inert to the raw material resin, which is injected in the downstream of the plasticization portion through the fluid-dispersing nozzle, and it is adjusted to a temperature suitable for foaming in a cooling zone and molded through the dedicated die into a foamed material in the form of a sheet. The foamed resin sheet that has come out of the die is readily cooled with a proper cooling means, whereby the growth of gas bubbles is controlled to give a desired foamed resin sheet. The plasticization portion and the cooling zone may be provided in one extruder, or there may be employed a tandem method in which two extruders are connected in series. In the latter case, the raw material resin is melted and the molten resin is mixed with the gas to form a homogeneous phase in a first extruder, and then the molten resin with the gas injected into it is adjusted to a temperature suitable for the foaming while using the second extruder as the cooling zone. In this tandem method, melting and kneading are carried out in one extruder and cooling is carried out in another, so that the allowance of operation conditions is large and that the resin can be fully cooled. This tandem method is therefore suitable for producing a foamed sheet having a high cell content.

The temperature in the plasticization portion is preferably 280 to 350° C., more preferably 300 to 320° C. The gas inert to the raw material resin can be selected from those that are shown in the above method (1). The pressure for injecting the gas inert to the resin into the extruder is preferably 1 MPa or more, more preferably 5 MPa or more, still more preferably 10 MPa or more. This pressure is preferably a pressure at which the gas used comes into a supercritical state. The upper limit of the pressure for injecting the gas is not specially limited, while it is preferably adjusted to 50 MPa or less from the viewpoint of economic performance and operability. The amount of the gas to be injected, based on the resin weight, is preferably 0.1 to 0.5% by weight, more preferably 0.2 to 0.4% by weight. The temperature that the resin is required to reach in the cooling zone is preferably a temperature higher than Tg of the raw material resin used, by 125 to 150° C. When the polycarbonate is used as a raw material resin, this temperature is preferably 275 to 300° C.

The foaming agent that can be used in the above method (3) includes a chemical foaming agent and a physical foaming agent. Examples of the chemical foaming agent include organic foaming agents such as an azo compound, a nitroso compound, a hydrazine derivative, an isocyanate compound and the like, and inorganic foaming agents such as bicarbonate, carbonate, sodium bicarbonate+an acid, a zinc powder+ an acid and the like. The physical foaming agent includes butane, pentane, fron and the like, and it can be selected from these as required while taking account of compatibility with the material resin that constitutes the resin sheet. For example, when the polycarbonate resin is used as a material for the resin sheet, an azo compound such as azodicarbonamide or the like, or a bicarbonate such as sodium bicarbonate or the like is preferred.

The kind and amount of the foaming agent can be determined as required depending upon an intended cell content, an average cell diameter and the like, while the amount thereof is preferably 0.5 to 2 parts by weight per 100 parts by weight of the raw material resin.

The above methods (1) and (3) or the methods (2) and (3) may be employed in combination. Of these, it is preferred to employ the method (2) or a combination of the methods (2) and (3), and it is more preferred to employ the method (2). The method (2) is industrially excellent from the viewpoint that it is highly productive and suitable for the production of a light reflective plate having a large area, and that the post-processing of a foamed resin sheet obtained is easy.

When the light reflective plate of this invention has the protective film, as a method for laminating the protective film on the foamed resin sheet that constitutes a substrate of the light reflective plate, there can be employed a lamination method in which an organic polymer composition to form a protective film is melt-extruded through a T-die on the extrusion-molded foamed resin sheet, a method in which a protective film formed in the form of a film beforehand is continuously laminated on the surface of a resin sheet by using a heating roll or the like, during the step of producing the resin sheet, a co-extrusion method in which a foamed resin sheet and an organic polymer composition to form a protective film are simultaneously melt-extruded to form a laminate, a method in which a coating composition containing an organic polymer composition to form a protective film is applied onto a foamed resin sheet by a proper coating method, or a method in which a transfer foil having a protective film is transferred on the resin sheet to form a laminate.

The above coating method includes, for example, a dip coating method, a flow coating method, a roll coating method and the like.

As the above transfer foil, there is preferably used a transfer foil having a multi-layer structure having the constitution of base film/release layer/protective layer/organic polymer layer containing an ultraviolet absorbent (the above protective film)/adhesive layer. The adhesive layer of this transfer foil is bonded and attached on the foamed resin sheet and the base film is peeled off together with the release layer, whereby there can be obtained a light diffusing plate having the constitution of adhesive layer/ultraviolet-absorbent-containing organic polymer layer (the above protective film)/ protective layer laminated on the foamed resin sheet in this order from the sheet side.

When the lamination method or the co-extrusion method is employed as a method for forming the protective film, the thickness of the protective film is preferably in the range of 5 to 500 μm, more preferably in the range of 10 to 100 μm. When the coating method is employed, the thickness of the protective film is preferably in the range of 0.1 to 20 μm, more preferably in the range of 1 to 10 μm. Further, when the transfer foil is used, the thickness of the protective film is preferably in the range of 1 to 10 μm, more preferably in the range of 1 to 5 μm. The protective film preferably has a smaller thickness so long as it is within the above range, since the problem of distortion caused by a thermal shrinkage factor difference or water absorption difference between the foamed resin sheet and the protective film does not actually appear.

[Light Diffusing Plate]

The thickness of the light diffusing plate of this invention is preferably 0.5 to 10 mm, more preferably 1 to 5 mm.

The number average diameter of closed-cells contained in the light diffusing plate of this invention is in the range of 30 to 100 μm, preferably in the range of 40 to 95 μm, more preferably in the range of 50 to 90 μm. When the number average diameter of the closed-cells is less than 30 μm, the light transmittance is sometimes low, and when it exceeds 100 μm, the diffusing capability of the foamed resin sheet is sometimes insufficient, which are sometimes undesirable for the light diffusing plate. The number average diameter of the closed-cells can be determined in the same manner as in the above light reflective plate.

The light diffusing plate of this invention has a cell content of 10 to 90 vol %, and this value is preferably 20 to 85 vol %, more preferably 30 to 80 vol %. When this value is less than 10 vol %, no sufficient light diffusing capability may be obtained in some cases, and when it exceeds 90 vol %, the total light transmittance may be insufficient in some cases and a foamed resin sheet obtained may be sometimes impaired in mechanical properties, which are undesirable.

In the light diffusing plate of this invention, the relationship between the number average diameter X (μm) of the closed-cells and the cell content Y (vol %) satisfies the following expression (5).

$$1.4 \times \log_{10}(X) - 1.5 \leq \log_{10}(Y) \leq 2.5 \times \log_{10}(X) - 2.2 \quad (5)$$

When the above expression (5) is satisfied, it is made easier to attain a transmission haze value of 95% or more and a total light transmittance of 50% or more.

When the relationship between the number average diameter X (μm) of the closed-cells and the cell content Y (vol %) further satisfies the following expression (6), $$1.4 \times \log_{10}(X) - 1.25 \leq \log_{10}(Y) \quad (6)$$

it is made easier to satisfy a transmission haze value of 98% or more, and when it satisfies the following expression, $$1.4 \times \log_{10}(X) - 0.95 \leq \log_{10}(Y)$$

it is made easier to satisfy a transmission haze value of 99% or more, which is particularly preferred.

Further, when the relationship between the number average diameter X (μm) of the closed-cells and the cell content Y (vol %) satisfies the following expression (7), $$\log_{10}(Y) \leq 2.5 \times \log_{10}(X) - 2.45 \quad (7)$$

it is made easier to attain a total light transmittance of 60% or more, and when it further satisfies the following expression, $$\log_{10}(Y) \leq 2.5 \times \log_{10}(X) - 2.60$$

it is made easier to attain a light transmittance of 70% or more, which is particularly preferred.

The above foamed resin sheet exhibits a high total light transmittance and a high transmission haze value and can be suitably used as a light diffusing plate for a direct backlight liquid crystal display. The transmission haze as used herein refers to a ratio of the total amount of light that is transmitted through but does not go straight to the total amount of light that is transmitted through when light is caused to enter a light diffusing plate at an incidence angle of 0°.

The light diffusing plate of this invention has a total light transmittance of 50% or more and a transmission haze value of 95% or more. The above total light transmittance is preferably 60% or more, more preferably 70% or more. The above transmission haze is preferably 98% or more, more preferably 99% or more. The above high total light transmittance and high transmission haze can be realized when the relationship between the number average diameter X (μm) of the closed-cells contained in the foamed resin sheet and the cell content Y (vol %) thereof is attained as described above.

In the light diffusing plate of this invention, the above total light transmittance and transmission haze value are uniform all over its remarkably large area range. In the light diffusing plate of this invention, the value obtained by dividing a difference between an average value of total light transmittances at two points 450 mm far away in the width direction from a center point in the width direction thereof and a total light transmittance at the above center point by the total light transmittance at the above center point can be within ±0.05. Further, it can be within ±0.03, and in particular it can be within ±0.02. Further, the value obtained by dividing an average value of transmission hazes at two points 450 mm far away in the width direction from a center point in the width direction of the light diffusing plate of this invention by a transmission haze at the above center point can be 0.95 to 1.05, further, it can be 0.97 to 1.03, and in particular it can be 0.99 to 1.01. The "width direction" in the above description refers to a direction in parallel with the minor side of a light diffusing plate.

Therefore, the diffusing plate can be suitably used in a large-screen liquid crystal display.

As described above, the light diffusing plate of this invention contains the closed-cells dispersed in the resin matrix. In the light diffusing plate of this invention, the gas to be contained in the closed-cells is the same as that which is described as the gas contained in the closed-cells of the light reflective plate of this invention.

Examples of the material for constituting the matrix resin of the light diffusing plate of this invention include, as preferred resins, thermoplastic resins such as a polycarbonate resin, a polystyrene resin, a polymethyl methacrylate resin, a non-crystalline polyester resin, a styrene-acrylonitrile copolymer resin, a norbornene resin, a non-crystalline fluorine resin, a polyethersulfone resin, a polysulfone resin, a polyetherimide resin, a polyallylate resin, a triacetyl cellulose resin, a non-crystalline nylon resin, a polypropylene resin, a polyethylene resin, poly-4-methylpentene-1 and the like. These resins may be used singly or may be used as a mixture of the two or more of these. Of these, a polycarbonate resin, a polymethyl methacrylate resin or a norbornene resin is preferred, and a polycarbonate resin is particularly preferred. The polycarbonate resin that is suitably used as a material for constituting the matrix resin of the light diffusing plate of this invention is the same as that which is described as the polycarbonate resin that is suitably used as a material for constituting the matrix resin of the light reflective plate of this invention.

The light diffusing plate of this invention can have a protective film on at least one surface. Preferably, the light diffusing plate of this invention has the protective film on its surface that is to be on the light source side when it is incorporated into a backlight unit and used. The material for constituting the protective film that the light diffusing plate of this invention can have is the same as that which is already described as the material for constituting the protective film that the light reflective plate of this invention can have.

[Method for Producing Light Diffusing Plate]

The light diffusing plate of this invention can be produced according to any one of the methods (1) to (3) that are already described as a method for producing the light reflective plate of this invention.

Since, however, the average cell diameter and cell content suitable for the light diffusing plate differ from those suitable for the light reflective plate, it is preferred to modify the following points in the above methods (1) to (3) when the methods are applied.

In the method (1), the heating temperature after a sheet impregnated with the gas is taken out of the pressure vessel is preferably a temperature higher than Tg of the resin by 0 to 5° C. When the material resin is a polycarbonate resin, this temperature is preferably 150 to 155° C.

In the method (2), the temperature that the resin is to reach in the cooling zone is preferably a temperature higher than Tg of a used raw material resin by 50 to 110° C. When a polycarbonate resin is used as a raw material resin, this temperature is preferably 200 to 260° C.

In the method (3), modifications obvious to one skilled in the art are added to what is already described as a method for producing the light reflective plate and the method (3) is carried out, whereby the light diffusing plate can be produced.

The above methods (1) and (3) or the above methods (2) and (3) may be used in combination.

As a method for producing the light diffusing plate of this invention, it is preferred to employ the method (2) or a combination of the methods (2) and (3), and it is more preferred to employ the method (2).

[Direct Backlight Unit]

The direct backlight unit of this invention comprises at least a plurality of linear light sources, a box for housing said linear light sources and a light diffusing plate arranged in an opening portion of said box, the light reflective plate of this invention being attached to an internal surface of said box or said light diffusing plate being the light diffusing plate of this invention.

The above linear light sources can be any light sources so long as they are arranged directly below the light-emission surface of a backlight unit and can emit visible light. For example, an incandescent lamp, a fluorescent discharge tube, a light emission diode device, a fluorescent light emission device and the like, can be used, while fluorescent discharge tubes are preferred from the viewpoint of luminance, color temperature and the like, and of these, a cold cathode fluorescent lamp is preferred. In particular, there is preferably used a cold cathode fluorescent lamp using a three-band phosphor whose power consumption is recently decreased and which is adapted for high luminance and high color rendering. In the cold cathode fluorescent lamp, proper amounts of mercury and inert gas (argon, neon, gas mixture and the like) are sealed in a glass tube having an internal wall to which a fluorescent substrate (material) is applied, and columnar electrodes are attached to both ends of the glass tube. When a high voltage is applied between the two electrodes, electrons slightly existing in the tube are rapidly attracted to the electrodes to collide and at this time, secondary electrons are released to start a discharge. In this discharge, electrons that are attracted to the anode and mercury molecules in the tube collide to radiate ultraviolet light having a wavelength of about 250 nm, and the ultraviolet light excites the fluorescent substrate (material) to emit visible light.

Preferably, a plurality of the above linear light sources are arranged in series at nearly equal intervals. The number of the linear light sources can be arbitrary, and for example, 6 to 50 linear light sources can be provided. Preferably, the linear light sources are housed in a box whose top surface is open, and the box has a highly reflective coating composition applied to the internal surface thereof or a highly reflective film agent attached thereto. In particular, the box preferably has the light reflective plate of this invention attached to the internal surface thereof.

A light diffusing plate is arranged in the opening portion of the box housing the above linear light sources. In the light diffusing plate used here, the visible light transmittance thereof is preferably 50% or more, more preferably 60% or more, still more preferably 65% or more, particularly preferably 70% or more. The transmission haze value of the light diffusing plate is preferably 95% or more, more preferably 98% or more, still more preferably 99% or more. The above light diffusing plate can be selected, for example, from a sheet formed of a transparent resin sheet and a light diffusing agent such as organic fine particles dispersed and contained in the transparent resin sheet, a foamed resin sheet and the like, while it is preferred to use the light diffusing plate of this invention.

The direct backlight unit of this invention is preferably a unit in which the light reflective plate of this invention is attached to the internal surface of the box housing the linear light sources and the light diffusing plate of this invention is arranged in the opening portion of the box.

The above direct backlight unit has high luminance uniformity and exhibits improved front luminance, and it can exhibit high performances without being provided with part or the whole of an optical control film that has been used for improving the luminance.

(Direct Backlight Liquid Crystal Display)

The direct backlight liquid crystal display of this invention comprises at least the direct backlight unit of this invention and a liquid crystal panel, and can be produced by combining them. The direct backlight liquid crystal display of this invention may further have one or a plurality of optical control films as required in addition to the above-described.

The above liquid crystal panel preferably has a constitution in which a sheet polarizer is provided on at least one surface of a liquid crystal cell. The liquid crystal cell preferably has a structure in which two transparent substrates having a transparent electrode and an oriented film each are sealed in their circumferential portions and face each other through a space (cell gap) and a liquid crystal is filled in the cell gap divided by the internal surfaces of the substrates and a sealing agent. Examples of the above substrate include a glass, a resin and the like. Examples of the above crystal include a nematic liquid crystal and a smectic liquid crystal. Of these, a nematic liquid crystal is preferred, and for example there can be used a Schiff base liquid crystal, an azoxy liquid crystal, a biphenyl liquid crystal, a phenylcyclohexane liquid crystal, an ester liquid crystal, a terphenyl liquid crystal, a biphenylcyclohexane liquid crystal, a pyrimidine liquid crystal, a dioxane liquid crystal, bicyclooctane liquid crystal, a cubane liquid crystal and the like. Further, for example, cholesteric liquid crystals such as cholestyl chloride, cholesteryl nonaate, cholesteryl carbonate and the like, or chiral compounds commercially available in the trade names of "C-15" and "B-15" (both supplied by Merck AG) may be added to these liquid crystals for use thereof. Further, ferroelectric liquid crystals such as p-decyloxybenzylidene-2-amino-2-methylbutyl cinnamate can be also used. The above sheet polarizer includes, for example, a sheet polarizer formed of a polarizer film called "H film" obtained by causing a polyvinyl alcohol to absorb iodine while strand the likeh-orienting it and sandwiched with cellulose acetate protective films, and a sheet polarizer formed of the "H film" per se.

The liquid crystal panel for use in this invention may have, as required, a constitution in which a color filter is sandwiched between the liquid crystal cell and the sheet polarizer.

With regard to the optical control film, one or a plurality of optical control films can be arranged on the liquid crystal panel side of the direct backlight unit of this invention, i.e., between the light diffusing plate and the liquid crystal panel. This optical control film includes, for example, a condensing film, a diffusing film, a polarizing film and the like. The above condensing film includes, for example, a condensing film called "prism sheet" having its surface in the form of a prism (e.g., D-BEF, supplied by Yamagata 3M K.K.) and the like. The above diffusing film includes, for example, a film containing a diffusing agent and the like, and the above polarizing film includes, for example, a reflection polarizing film (e.g., D-BEF, supplied by Yamagata 3M K.K.). These optical control films can be arranged, for example, in the order of the diffusing film, the condensing film and the polarizing film, this order being started from the diffusing plate side.

Having the direct backlight unit of this invention which exhibits improved performances, the direct backlight liquid crystal display of this invention can exhibit high luminance uniformity and front luminance, for example, without the diffusing film of the above optical control films or without the diffusing film and the condensing film of them.

Effect of the Invention

The light reflective plate of this invention has excellent light diffuse reflection capability and is suitable as a light reflective plate for a direct backlight unit for use in a liquid crystal display or liquid crystal television set that has high luminance and is costwise advantageous, or as a light reflective plate for a scanner.

The light diffusing plate of this invention has high light transmissivity and has excellent light diffusing capability, and it is suitable as a light diffusing plate for a direct backlight unit for use in a liquid crystal display or liquid crystal television set that has high luminance and is costwise advantageous. The light reflective plate or light diffusing plate of this invention is suitable for use in a direct backlight unit of a large-screen liquid crystal display or 15 to 39 inch large-screen liquid crystal television set, and the industrial effect that this invention produces is remarkable.

EXAMPLES

This invention will be further specifically explained below with reference to Examples. Evaluation methods are as follows.

(1) Average Cell Diameter

The average cell diameter of a foamed resin sheet was determined by taking an electron photograph of a sample cross section of the foamed resin sheet with a scanning electron microscope (SEM) and then statistically processing it with an image processing software.

That is, a foamed resin sheet sample having a size of 15 mm×8 mm was prepared first by cutting and fixed to the holder of a microtome. This sample was fed 30 μm each time in the thickness direction of the sample, and a cross section of the sample was cut open with a microtome blade made of metal to expose a measurement surface. Then, the sample cut to have a height (thickness) of 2 mm was attached to a sample bed with a double coated tape, with the measurement surface of the sample facing upward. Platinum sputtering was carried out on the sample and the sample bed, and the sample was used for observation through SEM. As the SEM, "S-3500N" supplied by Hitachi Hi-Technologies Corporation was used, and the photograph was taken under conditions including an accelerating voltage of 15 kV, a tilt angle of 0° and a magnifying power of 70 to 2,000.

This electron photograph data was loaded into an image analyzing software "Win ROOF" (Mitani Corporation). On the image analyzing screen, an image region containing approximately 400 cells was set as a processing region, binarized with the image analysis software and statistically processed to calculate diameters corresponding to true circles. In the above processing region, the diameter of a cell that was not connected to another or combined with another and that exhibited a maximum diameter was employed as a cell diameter in the above processing region. Then, other image region was set at a processing region, the same procedures were repeated 10 times and an average value thereof was taken as an average cell diameter of the subject sample.

(2) Cell Content

A 5 cm×5 cm sample that was cut off a foamed resin sheet was measured for a specific gravity with an electron density meter "MD-300S" supplied by Alfa Mirage Co., Ltd., and this value was substituted in the following expression to determine a cell content.

Cell content(vol %)=$(1-\rho/\rho_0) \times 100$

In the above expression, $\rho_0$ is a specific gravity 1.20 g/cm$^3$ of polycarbonate and $\rho$ is a specific gravity (g/cm$^3$) of a measurement sample.

(3) Diffuse Reflectance

Total defuse reflection components were measured for spectral intensity as relative values (%) to light reflected from a barium sulfate white plate with a spectrophotometer "U-4100" (supplied by Hitachi Hi-Technologies Corporation) in a reflectance measurement mode under conditions including an incidence angle of 0°, a measurement wavelength region of 400 to 800 nm, a sampling intervals of 1 nm and a scanning speed of 120 nm/minute, and these are integrated in the entire measurement wavelength region and averaged. The thus-obtained value was used as a diffuse reflectance.

The measurement for the diffuse reflectance was conducted at three points in total, the center point in the width direction of a foamed resin sheet and two points 450 mm far away in the width direction from the above center point, and Table to be described later show an average of diffuse reflectance values at the two points far away from the center point together with the diffuse reflectance at the center point.

(4) Reflection Haze

A foamed resin sheet was measured with a GONIO-PHOTOMETER "GC5000L" supplied by Nippon Denshoku Industries Co., Ltd. under conditions including a floodlighting angle of −45° and a light receiving angle of −85 to 85° (0.10 unit), and its reflection haze was determined on the basis of the following expression.

Reflection haze(%)=$Td/Tt \times 100$ wherein Td is a total of light reflection quantity at reflection angles of 42.5° or less and 47.5° or more and is defined on the basis of the following expression.

$Td=R(-85.0°)+R(-84.9°)+ \ldots +R(42.5°)+R(47.5°)+R(47.6°)+ \ldots +R(85.0°)$

In the above expression, R(X°) is a reflection quantity at an angle X°. Further, Tt is a total light reflection quantity and is shown by the following expression.

$Tt=Td+Tp$

Tp is a total of light reflection quantity at a reflection angle of 42.6 to 47.4° and is defined by the following expression.

$Tp=R(42.6°)+R(42.7°)+ \ldots +R(47.4°)$

In the above expression, R(X °) has the same meaning as that in the expression defining Td.

The measurement for the reflection haze was conducted at three points in total, the center point in the width direction of a foamed resin sheet and two points 450 mm far away in the width direction from the above center point, and Table to be described later show an average of reflection haze values at the two points far away from the center point together with the reflection haze at the center point.

(5) Light Resistance (Hue Change)

A light reflective plate was incorporated into a model 15 direct backlight unit supplied by NEC Corporation and the lighting of the unit was continuously maintained for 5,000 hours. Then, the light reflective plate was taken out and evaluated for a change in hue ($\Delta YI$) between that before the test and that after the test. The measurement for hue (YI) was carried out with a spectral color meter "SE-2000" supplied by Nippon Denshoku Industries Co., Ltd. When a light reflective plate had a protective film, the light reflective plate was incorporated into a backlight unit to ensure that the surface having the protective film was on the cold cathode fluorescent lamp side.

(6) Total Light Transmittance

A value obtained by measurement with a turbidmeter "NDH2000" supplied by Nippon Denshoku Industries Co., Ltd. according to JIS K 7361.

The measurement for the total light transmittance was conducted at three points in total, the center point in the width direction of a foamed resin sheet and two points 450 mm far away in the width direction from the above center point, and Tables to be described later show an average of total light transmittances at the two points far away from the center point together with the total light transmittance at the center point.

(7) Transmission Haze

Measurement was made with a turbidmeter "NDH2000" supplied by Nippon Denshoku Industries Co., Ltd. according to JIS K 7136, and the transmission haze was determined on the basis of the following expression.

Transmission haze(%)=$T'd/T't \times 100$

In the above expression, T'd is a light transmission quantity at a diverging angle of 2.5° or more, and T't is a total light transmission quantity and satisfies the following expression.

$T't=T'd+T'p$ wherein T'p is a light transmission quantity at a divergence angle of less than 2.5°.

Example 1 and Comparative Examples 1 to 4

100 Parts by weight of a polycarbonate resin having a viscosity average molecular weight of 24,300, obtained from bisphenol A and phosgene by an interfacial polymerization method, and 0.3 part by weight of a benzotriazole compound 2-(2-hydroxy-5-tert-octylphenyl)benzotriazole (trade name "ChemiSorb 79", supplied by CHEMIPRO KASEI KAISHA, LTD.) as an ultraviolet absorbent were mixed, and the mixture was fed into a single-screw extruder supplied by The Japan Steel Works, Ltd. The above mixture was melted by adjusting the temperature of the plasticization portion in the extruder to 300 to 320° C., and then, in the downstream of the plasticization portion, a carbon dioxide gas was injected at a temperature of 280 to 300° C. at a pressure of 20 MPa and at a gas weight ratio shown in Table 1. The mixture was fully kneaded, the resin mixture was cooled in a cooling zone of the extruder to a temperature described in "Resin temperature" of Table 1 and extruded through a die at this temperature, and the pressure was removed to give a foamed resin sheet. The above gas weight ratio refers to a weight ratio of an amount of the injected carbon dioxide gas to an output amount of the foamed resin (the gas weight ratio will be used in this sense hereinafter).

The extruded foamed resin sheet was held between two pairs of rolls having a diameter of 300 mm each together with a protective film that was prepared in advance, to thermally bond (laminate) the protective film on one surface of the sheet, and the laminate was rapidly cooled in water at 3° C., to give an approximately 2 mm thick and 1,000 mm wide foamed polycarbonate (PC) sheet (light reflective plate) having the protective film on one surface thereof. Table 1 shows a found value of sheet thickness of each sheet. These values are values that do not include protective film thicknesses. As the above protective film, there was used a 50 μm thick and 1,000 mm wide polymethacrylate resin film containing 1 part by weight of a benzotriazole compound per 100 parts by weight of the resin (trade name "Sunduren film SD014NRT" supplied by Kaneka Corporation).

Table 1 shows foaming properties of the thus-obtained light reflective plate and Table 2 shows the optical properties and hue change thereof.

Example 2

100 Parts by weight of a polycarbonate resin having a viscosity average molecular weight of 24,300, obtained from bisphenol A and phosgene by an interfacial polymerization method, and 0.3 part by weight of a benzotriazole compound 2-(2-hydroxy-5-tert-octylphenyl)benzotriazole (trade name "ChemiSorb 79", supplied by CHEMIPRO KASEI KAISHA, LTD.) as an ultraviolet absorbent were mixed, and the mixture was fed into a single-screw extruder supplied by The Japan Steel Works, Ltd. The above mixture was melted by adjusting the temperature of the plasticization portion in the extruder to 300 to 320° C., and then, in the downstream of the plasticization portion, a carbon dioxide gas was injected at a temperature of 280 to 300° C. at a pressure of 20 MPa and at a gas weight ratio of 0.0023. The mixture was fully kneaded. Further, the temperature of the cooling zone was adjusted to 275° C.

On the other hand, 100 parts by weight of a polycarbonate resin having a viscosity average molecular weight of 24,300, obtained from bisphenol A and phosgene by an interfacial polymerization method, and 3 parts by weight of a benzotriazole compound 2-(2-hydroxy-5-tert-octylphenyl)benzotriazole (trade name "ChemiSorb 79", supplied by CHEMIPRO KASEI KAISHA, LTD.) as an ultraviolet absorbent were mixed and extrusion-granulated to obtain a composition for a protective film, and the composition for a protective film was fed into an auxiliary extruder having a screw diameter of 50 mm and melted at an extruder temperature of 250 to 300° C.

From the above two extruders, a foamed polycarbonate resin sheet having a thickness adjusted to 2.01 mm and a protective film having a thickness adjusted to 50 μm were co-extruded through a feed block and a T-die each as a laminated sheet having a width of 1,000 mm, and then the laminated sheet was rapidly cooled with water at 3° C., to give a 2.01 mm thick and 1,000 mm wide foamed polycarbonate resin sheet (light reflective plate) having the protective film on one surface thereof.

Table 1 shows foaming properties of the thus-obtained light reflective plate and Table 2 shows the optical properties and hue change thereof.

Example 3

100 Parts by weight of a polycarbonate resin having a viscosity average molecular weight of 24,300, obtained from bisphenol A and phosgene by an interfacial polymerization method, and 0.3 part by weight of a benzotriazole compound 2-(2-hydroxy-5-tert-octylphenyl)benzotriazole (trade name "ChemiSorb 79", supplied by CHEMIPRO KASEI KAISHA, LTD.) as an ultraviolet absorbent were mixed, and the mixture was fed into a single-screw extruder supplied by The Japan Steel Works, Ltd. The above mixture was melted by adjusting the temperature of the plasticization portion in the extruder to 300 to 320° C., and then, in the downstream of the plasticization portion, a carbon dioxide gas was injected at a temperature of 280 to 300° C. at a pressure of 20 MPa and at a gas weight ratio of 0.0025. The mixture was fully kneaded. After it was fully kneaded, the resin mixture was cooled to a temperature of 275° C. in a cooling zone in the extruder, it was extruded through a die at this temperature and the pressure was removed to give a 1.97 mm thick foamed resin sheet.

An acrylic resin coating composition prepared from the following components (solid content of coating composition 14% by weight) was applied onto one surface of the above-obtained foamed resin sheet by a flow coating method, and the coated sheet was left at room temperature for 25 minutes. The coated sheet was heated in a hot air circulating dryer at 120° C. for 40 minutes to give a 1.97 mm thick and 1,000 mm wide foamed polycarbonate resin sheet (light reflective plate) having, a 5 μm thick acryl cured layer as a protective film on one surface thereof.

The components of the acrylic resin coating composition used above are as follows.
(A) Curing resin; Polymethyl methacrylate 11.5 parts by weight
(B) Ultraviolet absorbent; 2-hydroxy-4-n-octoxybenzophenone 2.5 parts by weight
(C) Solvent; Isobutyl alcohol 28 parts by weight
(D) Solvent; Ethylene glycol monoethyl ether 28 parts by weight
(E) Solvent; 4-Hydroxy-4-methyl-2-pentanone 30 parts by weight Table 1 shows foaming properties of the thus-obtained light reflective plate and Table 2 shows the optical properties and hue change thereof.

Example 4

100 Parts by weight of a polycarbonate resin having a viscosity average molecular weight of 24,300, obtained from bisphenol A and phosgene by an interfacial polymerization method, and 0.3 part by weight of a benzotriazole compound 2-(2-hydroxy-5-tert-octylphenyl)benzotriazole (trade name "ChemiSorb 79", supplied by CHEMIPRO KASEI KAISHA, LTD.) as an ultraviolet absorbent were mixed, and the mixture was fed into a single-screw extruder supplied by The Japan Steel Works, Ltd. The above mixture was melted by adjusting the temperature of the plasticization portion in the extruder to 300 to 320° C., and then, in the downstream of the plasticization portion, a carbon dioxide gas was injected at a temperature of 280 to 300° C. at a pressure of 20 MPa and at a gas weight ratio of 0.0024. After the mixture was fully kneaded, the resin mixture was cooled to a temperature of 275° C. in a cooling zone in the extruder, it was extruded through a die at this temperature and the pressure was removed to give a foamed resin sheet.

The extruded foamed resin sheet was held between two pairs of rolls having a diameter of 300 mm each together with a transparent ultraviolet light blocking protective transfer foil (supplied by Oike & Co., Ltd.) to thermally bond the above transfer foil to one surface of the sheet, and the laminate was rapidly cooled in water at 3° C. Then, the polyethylene terephthalate film of the transfer foil was peeled off together with an acrylic resin release layer to give a 1.99 mm thick and 1,000 mm wide foamed polycarbonate resin sheet (light reflective plate) having a protective film on one surface thereof.

The above transfer foil had a width of 1,000 mm and was a laminate having a constitution of a polyethylene terephthalate film (thickness 12 μm)/acrylic resin release layer (thickness 0.5 μm)/acrylic resin protective layer (thickness 0.8 μm)/ultraviolet light blocking layer (copolymer of methyl methacrylate:2-hydroxy-4-(methacryloxyethoxy)benzophenone=7:3 (molar ratio), number average molecular weight as a polystyrene 200,000, thickness 2.0 μm)/acrylic resin adhesive layer (thickness 0.8 μm) stacked in this order. When the laminate was held between the rolls, it was inserted to ensure that the acrylic resin adhesive layer was on the foamed resin sheet side.

Table 1 shows foaming properties of the thus-obtained light reflective plate and Table 2 shows the optical properties and hue change thereof.

Example 5

A 150 μm thick and 1,000 mm wide foamed polycarbonate resin sheet (light reflective plate) having a protective film on one surface thereof was obtained under the same conditions as those in Example 4 except that the die lip clearance was adjusted. This foamed polycarbonate sheet was taken up around a take-up roll to form a roll of the foamed polycarbonate resin sheet having a length of 500 m.

Table 1 shows foaming properties of the thus-obtained light reflective plate and Table 2 shows the optical properties and hue change thereof.

Examples 6 and 7

100 Parts by weight of a polycarbonate resin having a viscosity average molecular weight of 24,300, obtained from bisphenol A and phosgene by an interfacial polymerization method, and 0.3 part by weight of a benzotriazole compound 2-(2-hydroxy-5-tert-octylphenyl)benzotriazole (trade name "ChemiSorb 79", supplied by CHEMIPRO KASEI KAISHA, LTD.) as an ultraviolet absorbent were mixed, and the mixture was fed into a single-screw extruder supplied by The Japan Steel Works, Ltd. The above mixture was melted by adjusting the temperature of the plasticization portion in the extruder to 300 to 320° C., and then, in the downstream of the plasticization portion, a carbon dioxide gas was injected at a temperature of 280 to 300° C. at a pressure of 20 MPa and at a gas weight ratio shown in Table 1. The mixture was fully kneaded, the resin mixture was cooled in the cooling zone of the extruder to a temperature of 278° C. and extruded through a die at this temperature, and the pressure was removed to give an approximately 2 mm thick and 1,000 mm wide foamed resin sheet (light reflective plate).

Table 1 shows foaming properties of the thus-obtained light reflective plate and Table 2 shows the optical properties and hue change thereof.

Comparative Examples 5 and 6

A polyethylene terephthalate (PET) film (supplied by Teijin DuPont Films Japan Ltd., HS grade) that had been cut in a size of 10 cm in length and 2 cm in width was placed in a pressure vessel and temperature was increased up to 100° C. over 30 minutes to make it reach a stationary state. Then, while this temperature was maintained, carbon dioxide was injected up to a pressure of 15 MPa, and this pressure was maintained for 3 hours. And, the pressure in the vessel was reduced to atmospheric pressure over several seconds, and cooled to room temperature over 30 minutes to give a foamed PET sheet (light reflective plate).

Table 1 shows foaming properties of the thus-obtained light reflective plate and Table 2 shows the optical properties and hue change thereof.

TABLE 1

| | | | Extrusion conditions | | | | Foaming properties | |
|---|---|---|---|---|---|---|---|---|
| | Substrate material | Method of forming protective film | Gas injection pressure (MPa) | Gas weight ratio | Cooling zone resin temperature (° C.) | Sheet thickness (μm) | Average cell diameter (μm) | Cell content (vol %) |
| Ex. 1 | PC | Laminating | 20 | 0.003 | 275 | 1950 | 4.8 | 35.2 |
| Ex. 2 | PC | Co-extrusion | 20 | 0.0023 | 275 | 2010 | 4.4 | 67.0 |
| Ex. 3 | PC | Flow coating | 20 | 0.0025 | 275 | 1970 | 4.6 | 49.8 |
| Ex. 4 | PC | Transfer foil | 20 | 0.0024 | 275 | 1990 | 4.9 | 54.6 |
| Ex. 5 | PC | Transfer foil | 20 | 0.0024 | 275 | 150 | 4.9 | 53.8 |
| Ex. 6 | PC | Nil | 20 | 0.0023 | 278 | 2000 | 4.7 | 63.2 |
| Ex. 7 | PC | Nil | 20 | 0.0024 | 278 | 1980 | 4.9 | 52.8 |
| C. Ex. 1 | PC | Laminating | 20 | 0.01 | 275 | 1950 | 5.1 | 4.0 |
| C. Ex. 2 | PC | Laminating | 20 | 0.0027 | 270 | 2060 | 12 | 43.1 |
| C. Ex. 3 | PC | Laminating | 20 | 0.0027 | 265 | 2020 | 35 | 42.7 |

TABLE 1-continued

| | Substrate material | Method of forming protective film | Extrusion conditions | | | Sheet thickness (μm) | Foaming properties | |
| | | | Gas injection pressure (MPa) | Gas weight ratio | Cooling zone resin temperature (°C.) | | Average cell diameter (μm) | Cell content (vol %) |
|---|---|---|---|---|---|---|---|---|
| C. Ex. 4 | PC | Laminating | 20 | 0.01 | 275 | 2000 | 3.0 | 6.0 |
| C. Ex. 5 | PET | Nil | — | — | — | 150 | 0.78 | 43.7 |
| C. Ex. 6 | PET | Nil | — | — | — | 180 | 2.5 | 39.6 |

Ex.: Example
C. Ex.: Comparative Example

TABLE 2

| | Optical properties | | | | | | |
| | Diffuse reflectance | | | Reflection haze | | | |
| | Center point (v) | Points 450 mm far (w) | (v − w)/v | Center point (x) | Points 450 mm far (y) | y/x | Light resistance Hue change (ΔYI) |
|---|---|---|---|---|---|---|---|
| Ex. 1 | 81.7 | 81.2 | 0.01 | 99.6 | 99.4 | 1.00 | −1.1 |
| Ex. 2 | 85.4 | 84.7 | 0.01 | 99.4 | 99.5 | 1.00 | 5.2 |
| Ex. 3 | 83.1 | 82.3 | 0.01 | 99.5 | 99.3 | 1.00 | 3.7 |
| Ex. 4 | 83.8 | 83.0 | 0.01 | 99.6 | 99.4 | 1.00 | 4.3 |
| Ex. 5 | 83.4 | 84.0 | −0.01 | 99.4 | 99.5 | 1.00 | 3.5 |
| Ex. 6 | 85.7 | 85.0 | 0.01 | 99.5 | 99.2 | 1.00 | 12.3 |
| Ex. 7 | 84.0 | 83.2 | 0.01 | 99.4 | 99.2 | 1.00 | 14.9 |
| C. Ex. 1 | 58.0 | 54.5 | 0.06 | 99.7 | 99.5 | 1.00 | 0.9 |
| C. Ex. 2 | 60.1 | 67.0 | −0.11 | 99.4 | 97.8 | 0.98 | 1.9 |
| C. Ex. 3 | 33.6 | 37.8 | −0.13 | 99.5 | 97.4 | 0.98 | 3.2 |
| C. Ex. 4 | 70.2 | 65.5 | 0.07 | 99.6 | 99.3 | 1.00 | 2.1 |
| C. Ex. 5 | 68.8 | 64.2 | 0.07 | 99.6 | 99.4 | 1.00 | 9.1 |
| C. Ex. 6 | 65.0 | 60.5 | 0.07 | 99.4 | 99.2 | 1.00 | 10.5 |

Ex.: Example
C. Ex.: Comparative Example

In Examples 1 to 7, the average cell diameter is in the range of 0.1 to 5 μm, the cell content is in the range of 5 to 90 vol % and the relationship of the average cell diameter, the cell content and the sheet thickness also satisfies the foregoing expression (1), the light reflective plates having exhibited good properties as good as a refuse reflectance of 80% or more and a reflection haze value of 95% or more. On the other hand, as shown in Comparative Example 1, when the cell content was less than 5 vol %, the diffuse reflectance was insufficient. As shown in Comparative Examples 2 and 3, further, when the average cell diameter was over 5 μm, the diffuse reflectance was insufficient. As shown in Comparative Example 4, further, it is seen that even if the light reflective plate has an average cell diameter in the range of 0.1 to 5 μm and a cell content in the range of 5 to 90 vol %, the diffuse reflectance is also insufficient when the relationship of the average cell diameter, the cell content and the sheet thickness fails to satisfy the foregoing expression (1).

Examples 8 to 12 and Comparative Examples 7 to 10

100 Parts by weight of a polycarbonate resin having a viscosity average molecular weight of 24,300, obtained from bisphenol A and phosgene by an interfacial polymerization method, and 0.3 part by weight of a benzotriazole compound 2-(2-hydroxy-5-tert-octylphenyl)benzotriazole (trade name "ChemiSorb 79", supplied by CHEMIPRO KASEI KAI-SHA, LTD.) as an ultraviolet absorbent were mixed, and the mixture was fed into a single-screw extruder supplied by The Japan Steel Works, Ltd. The above mixture was melted by adjusting the temperature of the plasticization portion in the extruder to 300 to 320° C., and then, in the downstream of the plasticization portion, a carbon dioxide gas was injected at a temperature of 280 to 300° C. at a pressure of 20 MPa and at a gas weight ratio shown in Table 3. The resin mixture was fully kneaded. Then, in the cooling zone in the extruder, the resin mixture was cooled to a temperature shown in Table 3 and extruded through a die at this temperature, and the pressure was removed to give an approximately 2 mm thick and 1,000 mm wide foamed polycarbonate resin sheet (light diffusing plate). Table 3 shows a found value of thickness of each of the thus-obtained sheets.

Table 3 shows foaming properties of the thus-obtained light diffusing plates and Table 4 shows the optical properties thereof.

Example 13

A transfer foil was laminated on the foamed polycarbonate resin sheet obtained in Example 8 in the same manner as in Example 4, to give a foamed polycarbonate resin sheet (light diffusing plate) having a protective film on one surface thereof.

Table 3 shows foaming properties of the thus-obtained light diffusing plates and Table 4 shows the optical properties thereof.

Referential Examples 1 to 3

A composition prepared by mixing 100 parts by weight of a polycarbonate resin having a viscosity average molecular weight of 24,300, obtained from bisphenol A and phosgene by an interfacial polymerization method, with a diffusing agent shown in Table 5 in an amount shown in Table 5 was melt-extruded with a vented T-die extruder at an extruder temperature of 250 to 300° C. and at a die temperature of 260 to 300° C. while maintaining the vacuum degree of a vent portion at 26.6 kPa, to give a 2.0 mm thick and 1,000 mm wide polycarbonate resin sheet.

Table 5 shows evaluation results of total light transmittances and transmission hazes of the thus-obtained sheets.

Diffusing agents shown in Table 5 are as follows.
A: Non-meltable acryl polymer fine particles "PARALOID EXL-5136®" (supplied by Rhom and Hass Company, weight average particle diameter 7 μm)
B: Crosslinked silicone resin "TOSPEARL 120®" (supplied by GE Toshiba Silicones, weight average particle diameter 2 μm)

TABLE 3

| | Extrusion conditions | | | Foaming properties | |
|---|---|---|---|---|---|
| | Gas injection pressure (MPa) | Gas weight ratio | Cooling zone resin temperature (° C.) | Sheet thickness (μm) | Average cell diameter (μm) | Cell content (vol %) |
| Ex. 8 | 20 | 0.003 | 257 | 2010 | 51.2 | 31.8 |
| Ex. 9 | 20 | 0.0022 | 258 | 2000 | 48.3 | 72.6 |
| Ex. 10 | 20 | 0.002 | 255 | 1990 | 53.4 | 89.0 |
| Ex. 11 | 20 | 0.0022 | 250 | 2010 | 69.4 | 72.7 |
| Ex. 12 | 20 | 0.002 | 245 | 2000 | 90.2 | 89.0 |
| Ex. 13 | 20 | 0.003 | 257 | 2010 | 51.2 | 31.8 |
| C. Ex. 7 | 20 | 0.01 | 270 | 2000 | 10.6 | 6.4 |
| C. Ex. 8 | 20 | 0.0024 | 263 | 2010 | 32.5 | 54.5 |
| C. Ex. 9 | 20 | 0.002 | 262 | 1990 | 35.7 | 72.8 |
| C. Ex. 10 | 20 | 0.02 | 265 | 2000 | 30.1 | 1.8 |

Ex.: Example
C. Ex.: Comparative Example

TABLE 4

| | Optical properties | | | | | |
|---|---|---|---|---|---|---|
| | Total light transmittance | | | Transmission haze | | |
| | Center point (p) % | Points 450 mm far (q) % | (p − q)/p | Center point (r) % | Points 450 mm far (s) % | s/r |
| Ex. 8 | 76.2 | 75.8 | 0.01 | 99.1 | 99.2 | 1.00 |
| Ex. 9 | 59.8 | 60.5 | −0.01 | 99.7 | 99.5 | 1.00 |
| Ex. 10 | 54.8 | 55.3 | −0.01 | 99.7 | 99.5 | 1.00 |
| Ex. 11 | 75.5 | 75.1 | 0.01 | 99.4 | 99.3 | 1.00 |
| Ex. 12 | 82.0 | 81.4 | 0.01 | 99.4 | 99.4 | 1.00 |
| Ex. 13 | 75.8 | 75.4 | 0.01 | 99.2 | 99.3 | 1.00 |
| C. Ex. 7 | 26.4 | 28.8 | −0.10 | 99.8 | 99.5 | 1.00 |
| C. Ex. 8 | 39.7 | 43.5 | −0.10 | 99.7 | 99.4 | 1.00 |
| C. Ex. 9 | 34.9 | 39.1 | −0.12 | 99.8 | 99.5 | 1.00 |
| C. Ex. 10 | 86.0 | 81.3 | 0.06 | 85.2 | 87.8 | 1.03 |

Ex.: Example
C. Ex.: Comparative Example

TABLE 5

| | Diffusing agent | | | Optical properties | |
|---|---|---|---|---|---|
| | Kind | Average particle diameter (μm) | Amount (part by weight) | Total light transmittance (%) | Transmission haze (%) |
| R. Ex. 1 | A | 7 | 3.5 | 54.3 | 99.3 |
| R. Ex. 2 | B | 2 | 0.8 | 56.5 | 99.3 |
| R. Ex. 3 | B | 2 | 0.43 | 62.7 | 99.2 |

R. Ex.: Referencial Example

In Examples 8 to 13, the average cell diameter is in the range of 30 to 100 μm, the cell content is in the range of 10 to 90 vol % and the relationship of the average cell diameter and the cell content satisfies the foregoing expression (5), the light diffusing plates having exhibited good properties as good as a total light transmittance of 50% or more and a transmission haze value of 95% or more. On the other hand, as shown in Comparative Example 7, when the average cell diameter was less than 30 μm and when the cell content was less than 10 vol %, the total light transmittance was extremely insufficient. As shown in Comparative Examples 8 and 9, further, even when the average cell diameter was in the range of 30 to 100 μm and when the cell content was in the range of 10 to 90 vol %, the total light transmittance was similarly insufficient when the relationship between the average cell diameter and the cell content failed to satisfy the foregoing expression (5). As shown in Comparative Example 10, further, it is seen that even if the average cell diameter is in the range of 30 to 100 μm, the transmission haze is insufficient when the cell content is less than 5 vol %.

Examples 14 and 15

The light diffusing plate obtained in Examples 8 and 9 were cut in a size of 150 mm in height and 300 mm in width each and the cut plates were respectively incorporated into direct backlights for a 26-inch TV. These backlights were backlights having a plurality of linear cold cathode fluorescent lamps each, the center-center distance between adjacent two lamps was 25 mm, and the distance from the lamps to the lamp side surface of the light diffusing plate was adjusted to 12 mm in each case. Each of the light diffusing plates was independently incorporated into the central portion of the backlight such that the longitudinal direction thereof was in parallel with the longitudinal direction of the lamps.

When the light sources were turned on for observation, the light sources were not seen through with regard to any one of the plates, the entire surface each of these was bright and no cyclic luminance non-uniformity was caused.

The invention claimed is:

1. A foamed resin sheet that has closed-cells having an average diameter of 0.1 to 5 μm, that has a thickness of 0.1 to 10 mm, that has a cell content of 5 to 90 vol %, that satisfies the following expression (1) in which X (μm) is an average diameter of the closed-cells, Y (vol %) is the cell content and T (mm) is a thickness of the sheet, that has a diffuse reflectance of 80% or more and a reflection haze value of 95% or more and that is for use as a light reflective plate, $$\log_{10}(Y) \geq A \times \log_{10}(X) + B \quad (1)$$

$$A = 0.037 \times T + 0.96$$

$$B = -0.203 \times T + 1.21.$$

2. The foamed resin sheet of claim 1, wherein the cell content is 5 to 45 vol %, and the relationship between the cell content Y (vol %) and the thickness T (mm) of the sheet satisfies the following expression (1) or (2), $$\log_{10}(Y) \geq A \times \log_{10}(X) + B \quad (1)$$

(in which $10^{\{(D-B)/(A-C)\}} \leq X \leq 5$)

$$\log_{10}(Y) \leq C \times \log_{10}(X) + D \quad (2)$$

(in which $0.1 \leq X \leq 10^{\{(D-B)/(A-C)\}}$)

$$A = 0.037 \times T + 0.96$$

$$B = -0.203 \times T + 1.21$$

$$C = 0.045 \times T + 0.28$$

$$D = -0.133 \times T + 1.02.$$

3. The foamed resin sheet of claim 2, wherein the relationship of the average diameter X(μm) of the closed-cells, the cell content Y (vol %) and the thickness T (mm) of the sheet satisfies the following expression (3) or (4), $$\log_{10}(Y) \geq E \times \log_{10}(X) + F \quad (3)$$

(in which $10^{\{(H-F)/(E-G)\}} < X \leq 5$)

$$\log_{10}(Y) \geq G \times \log_{10}(X) + H \quad (4)$$

(in which $0.1 \leq X \leq 10^{\{(H-F)/(E-G)\}}$)

$$E = 0.0065 \times T + 0.97$$

$$F = -0.117 \times T + 1.38$$

$$G = 0.027 \times T + 0.30$$

$$H = -0.104 \times T + 1.24.$$

4. The foamed resin sheet of claim 1, wherein the cell content is over 45 vol % but not more than 90 vol %.

5. The foamed resin sheet of claim 1, which has a resin coating layer containing an ultraviolet absorbent laminated at least one of its surfaces.

6. The foamed resin sheet of claim 1, which has a sheet thickness of 0.1 to 0.5 mm, a width of 1 to 2 m and a length of 100 to 1,000 m and which is wound in the form of a roll.

7. The foamed resin sheet of claim 1, wherein a value obtained by dividing a difference between an average value of diffuse reflectance values at two points 450 mm far away in the width direction of the sheet from a center point in the width direction thereof and a diffuse reflectance value at said center point by the diffuse reflectance value at said center point is within ±0.05.

8. The foamed resin sheet of claim 1, wherein a value obtained by dividing an average value of reflection hazes at two points 450 mm far away in the width direction of the sheet from a center point in the width direction thereof by a reflection haze at said center point is 0.95 to 1.05.

9. The foamed resin sheet of claim 1, wherein the light reflective plate is a light reflective plate for use in a direct backlight liquid crystal display.

10. A direct backlight unit comprising a light reflective plate, a light source and a light diffusing plate, the light reflective plate being the foamed resin sheet recited in claim 1.

11. A direct backlight liquid crystal display comprising the direct backlight unit recited in claim 10.

12. A foamed resin sheet that has closed-cells having an average diameter of 30 to 100 μm, that has cell content of 10 to 90 vol %, that satisfies the following expression (5) in which X (μm) is the average diameter of the closed-cells and Y (vol %) is the cell content, that has a total light transmittance of 50% or more and a transmission haze value of 95% or more and that is for use as a light diffusing plate, $$1.4 \times \log_{10}(X) - 1.5 \leq \log_{10}(Y) \leq 2.5 \times \log_{10}(X) - 2.2 \quad (5).$$

13. The foamed resin sheet of claim 12, wherein the average diameter X (μm) of the closed-cells and the cell content Y (vol %) have a relationship which satisfies the following expression (6)

$$1.4 \times \log_{10}(X) - 1.25 \leq \log_{10}(Y) \quad (6).$$

14. The foamed resin sheet of claim 12, wherein the average diameter X (μm) of the closed-cells and the cell content Y (vol %) have a relationship which satisfies the following expression (7)

$$\log_{10}(Y) \leq 2.5 \times \log_{10}(X) - 2.45 \quad (7).$$

15. The foamed resin sheet of claim 12, which has a thickness of 0.5 to 10 mm.

16. The foamed resin sheet of claim 12, wherein a value obtained by dividing a difference between an average value of total light transmittances at two points 450 mm far away in the width direction of the sheet from a center point in the width direction thereof and a total light transmittance at said center point by the total light transmittance at said center point is within ±0.05.

17. The foamed resin sheet of claim 12, wherein a value obtained by dividing an average value of transmission hazes at two points 450 mm far away in the width direction of the sheet from a center point in the width direction thereof by a transmission haze at said center point is 0.95 to 1.05.

18. The foamed resin sheet of claim 12, wherein the light diffusing plate is a light diffusing plate for use in a direct backlight liquid crystal display.

19. A direct backlight unit comprising a light reflective plate, a light source and a light diffusing plate, the light diffusing plate being the foamed resin sheet recited in claim 12.

20. A direct backlight liquid crystal display comprising the direct backlight unit recited in claim 19.

* * * * *